United States Patent
Modica et al.

(10) Patent No.: US 9,489,637 B2
(45) Date of Patent: Nov. 8, 2016

(54) METHOD AND APPARATUS FOR DERIVING SPATIAL PROPERTIES OF BUS STOPS AND TRAFFIC CONTROLS

(71) Applicant: HERE Global B.V., Veldhoven (NL)

(72) Inventors: Leo Modica, Wheaton, IL (US); Leon Stenneth, Chicago, IL (US)

(73) Assignee: HERE GLOBAL B.V., Eindhoven (NL)

(*) Notice: Subject to any disclaimer, the term of this patent is extended or adjusted under 35 U.S.C. 154(b) by 547 days.

(21) Appl. No.: 13/872,439

(22) Filed: Apr. 29, 2013

(65) Prior Publication Data

US 2014/0324748 A1   Oct. 30, 2014

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 99/00 | (2010.01) |
| G06N 3/08 | (2006.01) |
| G08G 1/123 | (2006.01) |
| G08G 1/00 | (2006.01) |

(52) U.S. Cl.
CPC ............ G06N 99/005 (2013.01); G06N 3/08 (2013.01); G08G 1/123 (2013.01); G08G 1/20 (2013.01)

(58) Field of Classification Search
None
See application file for complete search history.

(56) References Cited

U.S. PATENT DOCUMENTS

| | | | |
|---|---|---|---|
| 5,119,102 A * | 6/1992 | Barnard | 342/357.46 |
| 6,801,850 B1 | 10/2004 | Wolfson | |
| 7,469,827 B2 | 12/2008 | Katragadda et al. | |
| 2010/0131642 A1* | 5/2010 | Chalikouras et al. | 709/224 |
| 2010/0299055 A1 | 11/2010 | Hilbrandie et al. | |
| 2011/0213583 A1* | 9/2011 | Mao | G01S 5/0252 707/737 |
| 2013/0096815 A1 | 4/2013 | Mason et al. | |

OTHER PUBLICATIONS

"EasyTracker: Automatic Transit Tracking, Mapping, and Arrival Time Prediction Using Smartphones" Biagioni et al, Department of Computer Science University of Illinois at Chicago, Chicago, IL 60607, USA SenSys '11, Nov. 1-4, 2011, Seattle, WA, USA. Copyright 2011 ACM 978-1-4503-0718-5/11/11 . . . $10.00.*

(Continued)

*Primary Examiner* — Luis Sitiriche
(74) *Attorney, Agent, or Firm* — Alston & Bird LLP

(57) ABSTRACT

A method, apparatus and computer program products are provided for automatically detecting specific locations, i.e. bus stops, stop lights, and/or traffic signals, based on received GPS reports. The method can also be adopted to detect the utilization of the specific locations along the route. One example method includes receiving GPS data from a plurality of buses from along a transit route, and utilizes a machine learning classification strategy that captures the mobility patterns of the GPS equipped buses, at specific locations. The method may then generate mini-clusters, each comprised of a first location point from a first route and one or more subsequent location points located within a predetermined distance of the first location point. The mobility patterns of the mini-clusters within larger clusters are represented as a normalized histogram where the bin values become classification features. A machine learning model is then utilized to determine a location of the specific locations.

21 Claims, 6 Drawing Sheets

(56) References Cited

OTHER PUBLICATIONS

"Vehicle Route Prediction and Time of Arrival Estimation Techniques for Improved Transportation System Management" Karbassi et al,Electrical Engineering Universify of Califomia, Riverside, Riverside, CA 92521 0-7803-7848-2/03/$17.00 2003 IEEE.*
Cunningham, K.W., *Modeling Bus Routes and Bus Stops*, [online][retrieved May 31, 2013] Retrieved from: <URL: http://www.sdrmaps.com/html/KWC_papers/BiState%20Bus% 20Traffic.pdf> 4 pages.
Extended European Search Report from corresponding European Patent Application No. 14 16 4689, mailed Jul. 29, 2014.
Zhang, Hongming, et al.; "Object Detection Using Spatial Histogram Features"; *Image and Vision Computing*; vol. 24, No. 4; Apr. 1, 2006; pp. 327-341; XP027994846.

* cited by examiner

METHOD AND APPARATUS FOR DERIVING SPATIAL PROPERTIES OF BUS STOPS AND TRAFFIC CONTROLS

TECHNOLOGICAL FIELD

Embodiments of the present invention relate generally to a method, apparatus, and computer program product for automatically detecting bus stops, stop lights, and/or traffic signals based on received GPS reports and calculating a confidence rating.

BACKGROUND

Given a new transit service, determining accurate bus stop and/or traffic control locations is a time consuming, complex, and expensive task for transit agencies. Also, for an existing transit service (e.g., Chicago's CTA or New York's MTA) that already knows their bus stop locations, determining the locations of new stops after there is an incident such as construction or an accident, where the buses are re-routed from their original routes and new bus stops are required is just as time consuming, complex and expensive. A manual approach is taken by all transit agencies whereby people visit the field (i.e. transit service area) with GPS devices and collect and annotate route and bus stop data over several days. The present invention relates to a newly developed approach that is fully automated where instead of workers going into the field, buses belonging to the transit service produce the spatial properties, utilization of bus stops and traffic controls such as stop light and stop signs. Using localization (i.e. GPS) traces obtained from the buses and the method, apparatus, and/or computer program product, bus stop locations, stop sign locations and traffic light locations, bus stop utilization and confidence ratings are able to be accurately produced in real time on demand.

BRIEF SUMMARY

A method, apparatus and computer program product are therefore provided according to an example embodiment of the present invention to determine the locations of specific objects such as bus stops, on a transit route. More specifically, the present invention may determine locations of and distinguish between bus stops, stop signs and/or traffic lights along a traveled route given reported GPS locations from buses or passengers. In another embodiment, confidence ratings of the specific objects are calculated. Various categories of sources (e.g., buses, drivers, passengers) effect the confidence rating differently based on a trust level.

Generally, the present invention may utilize a machine learning classification strategy that captures the mobility patterns of any location reporting device, such as a GPS equipped buses, at specific locations, such as bus stops, stop signs, and/or traffic lights. More specifically, the mobility patterns may reflect the distributions of mini clusters within a given cluster set. These mobility patterns may then be represented as a normalized histogram where the bin values become classification features. With these mobility patterns represented as classification features, a machine learning model may then be used to determine a location of a specific object, such as bus stops, stop signs, and/or traffic lights, automatically without requiring humans to go into the field and collect and annotate these objects.

One example method may include causing reception of location data, wherein the location data is organized into a plurality of sets, each set comprised of a plurality of location points; generating a plurality of mini-clusters, each mini-cluster comprised of a first location point from a first set and one or more subsequent location points, wherein each subsequent location point is located within a predetermined distance of the first location point; determining a location of a specified object by utilizing one or more classification features of the mini-clusters. In one embodiment, the method may further include generating a histogram for each of a plurality of clusters, each cluster of a predetermined distance and comprising one or more mini-clusters within the distance, wherein each bin of the histogram represents a fraction of a maximum cluster size; generating a feature vector for each cluster, the feature vector comprising normalized values representing each of the bins of the histogram; distinguishing whether one or more clusters represent the specified object based on the feature vector. Additionally or alternatively, the method may further comprise receiving training data from location reporting devices; capturing classification features of training data; training a detection model to detect a bus stop based on the captured classification features; and wherein the distinguishing step applies the detection model to the feature vector to distinguish whether the feature vector represents the specified object.

In another embodiment, the method may include calculating a speed between consecutive location points from a same set, and wherein the one or more classification features comprises a value representing a number of location points where the calculated speed is less than a predetermined threshold. The feature vector may further include calculating an average speed across a cluster, wherein the one or more classification features comprises a value representing the average speed across the cluster. Further, inter and intra cluster distances of the points within the cluster can be considered. Additionally or alternatively, the one or more classification features may comprise a value representing a sum of at least two bins. The method may also include calculating a confidence rating for each location indicative of whether the location is being utilized as the specified object at a given time. The method may also include presenting a map comprising one or more bus stops along a route.

An example apparatus may include at least one processor and at least one memory storing computer program code, wherein the at least one memory and stored computer program code are configured, with the at least one processor, to cause the apparatus to receive location data, wherein the location data is organized into a plurality of sets, each set comprised of a plurality of location points; generate a plurality of mini-clusters, each mini-cluster comprised of a first location point from a first set and one or more subsequent location points, wherein each subsequent location point is located within a predetermined distance of the first location point; determine a location of a specified object by utilizing one or more classification features of the mini-clusters. The at least one memory and stored computer program code are further configured, with the at least one processor, to cause the apparatus to generate a histogram for each of a plurality of clusters, each cluster of a predetermined distance and comprising one or more mini-clusters within the distance, wherein each bin of the histogram represents a fraction of a maximum cluster size; generate a feature vector for each cluster, the feature vector comprising normalized values representing each of the bins of the histogram; distinguish whether one or more clusters represent the specified object based on the feature vector. In one embodiment, the at least one memory and stored computer program code are further configured, with the at least one processor, to cause the apparatus to receive training data from location reporting devices; capture classification features of training data; train a detection model to detect a bus stop based on the captured classification features; and wherein the distinguishing step applies the detection model to the feature vector to distinguish whether the feature vector represents the specified object.

In an alternative embodiment the at least one memory and stored computer program code are further configured, with the at least one processor, to cause the apparatus to calculating a speed between consecutive location points from a same set, and wherein the one or more classification features comprises a value representing a number of location points where the calculated speed is less than a predetermined threshold. In another embodiment, the at least one memory and stored computer program code are further configured, with the at least one processor, to cause the apparatus to calculating an average speed across a cluster, wherein the one or more classification features comprises a value representing the average speed across the cluster. The one or more classification features may comprise a value representing a sum of at least two bins. The at least one memory and the computer program code may further be configured to, with the processor, cause the apparatus to calculate a confidence rating for each location indicative of whether the location is being utilized as the specified object at a given time. The at least one memory and stored computer program code may be further configured, with the at least one processor, to cause the apparatus to present a map comprising one or more bus stops along a route.

In a further embodiment, a computer program product is provided that includes at least one non-transitory computer-readable storage medium having computer-readable program instructions stored therein, the computer-readable program instructions includes program instructions configured for causing reception of location data, wherein the location data is organized into a plurality of sets, each set comprised of a plurality of location points; generating a plurality of mini-clusters, each mini-cluster comprised of a first location point from a first set and one or more subsequent location points, wherein each subsequent location point is located within a predetermined distance of the first location point; determining a location of a specified object by utilizing one or more classification features of the mini-clusters. In another embodiment, the computer-readable program instructions also include program instructions configured for generating a histogram for each of a plurality of clusters, each cluster of a predetermined distance and comprising one or more mini-clusters within the distance, wherein each bin of the histogram represents a fraction of a maximum cluster size; generating a feature vector for each cluster, the feature vector comprising normalized values representing each of the bins of the histogram; distinguishing whether one or more clusters represent the specified object based on the feature vector. In one embodiment, the computer-readable program instructions also include program instructions configured for receiving training data from location reporting devices; capturing classification features of training data; training a detection model to detect a bus stop based on the captured classification features; and wherein the distinguishing step applies the detection model to the feature vector to distinguish whether the feature vector represents the specified object.

Additionally or alternatively, the computer-readable program instructions may also include program instructions configured for calculating a speed between consecutive location points from a same set, and wherein the one or more classification features comprises a value representing a number of location points where the calculated speed is less than a predetermined threshold. In another embodiment, the computer-readable program instructions also include program instructions configured for calculating an average speed across a cluster, wherein the one or more classification features comprises a value representing the average speed across the cluster. The one or more classification features may also comprise a value representing a sum of at least two bins. The computer-readable program instructions may also include program instructions configured for calculating a confidence rating for each location indicative of whether the location is being utilized as the specified object at a given time. The computer-readable program instructions may also include program instructions configured for may also further include presenting a map comprising one or more bus stops along a route.

One example apparatus may include means for causing reception of location data, wherein the location data is organized into a plurality of sets, each set comprised of a plurality of location points; generating a plurality of mini-clusters, each mini-cluster comprised of a first location point from a first set and one or more subsequent location points, wherein each subsequent location point is located within a predetermined distance of the first location point; determining a location of a specified object by utilizing one or more classification features of the mini-clusters. In another embodiment, the apparatus may further include means for generating a histogram for each of a plurality of clusters, each cluster of a predetermined distance and comprising one or more mini-clusters within the distance, wherein each bin of the histogram represents a fraction of a maximum cluster size; generating a feature vector for each cluster, the feature vector comprising normalized values representing each of the bins of the histogram; distinguishing whether one or more clusters represent the specified object based on the feature vector. In one embodiment, the apparatus may further include means for receiving training data from location reporting devices; capturing classification features of training data; training a detection model to detect a bus stop based on the captured classification features; and wherein the distinguishing step applies the detection model to the feature vector to distinguish whether the feature vector represents the specified object.

Additionally or alternatively, the apparatus may further include means for calculating a speed between consecutive location points from a same set, and wherein the one or more classification features comprises a value representing a number of location points where the calculated speed is less than a predetermined threshold. In another embodiment, the apparatus may further include means for calculating an average speed across a cluster, wherein the one or more classification features comprises a value representing the average speed across the cluster. The one or more classification features may also comprise a value representing a sum of at least two bins. The apparatus may further include means for calculating a confidence rating for each location indicative of whether the location is being utilized as the specified object at a given time. The apparatus may further include means for presenting a map comprising one or more bus stops along a route.

BRIEF DESCRIPTION OF THE DRAWINGS

Figure 1:
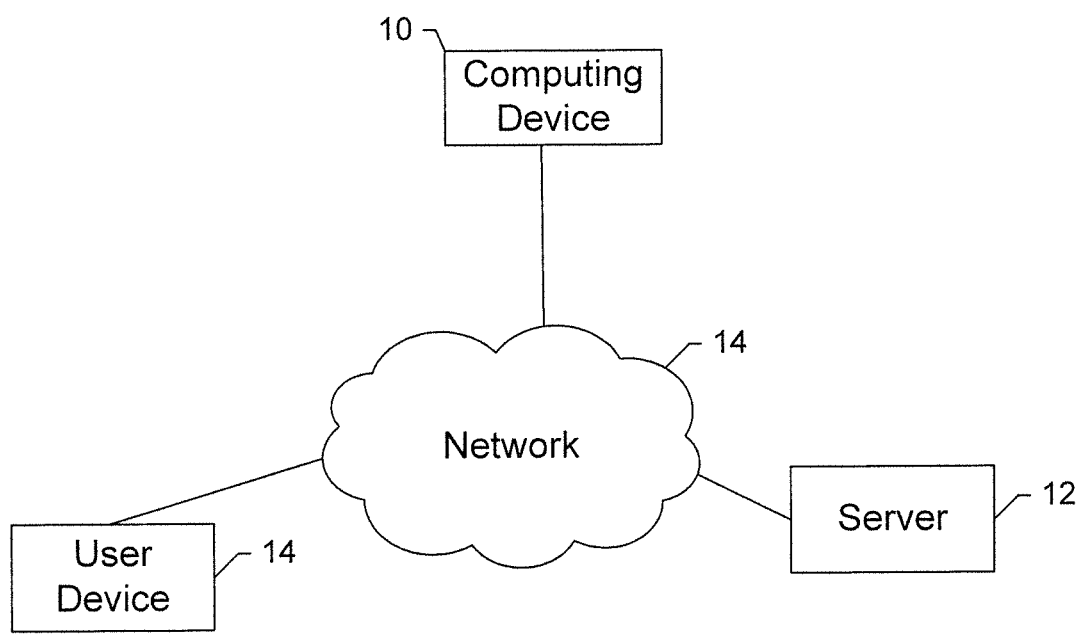
Figure 2:
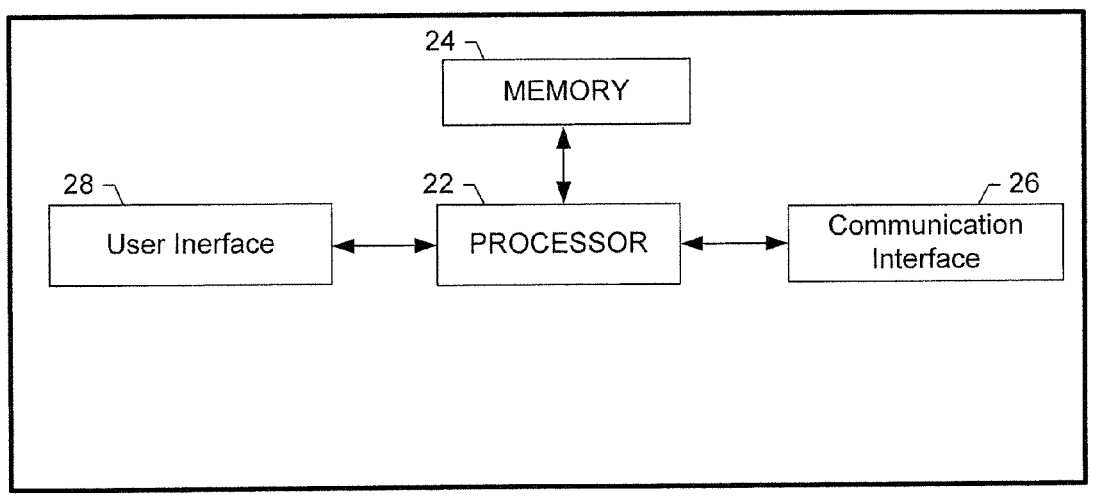
Figure 3:
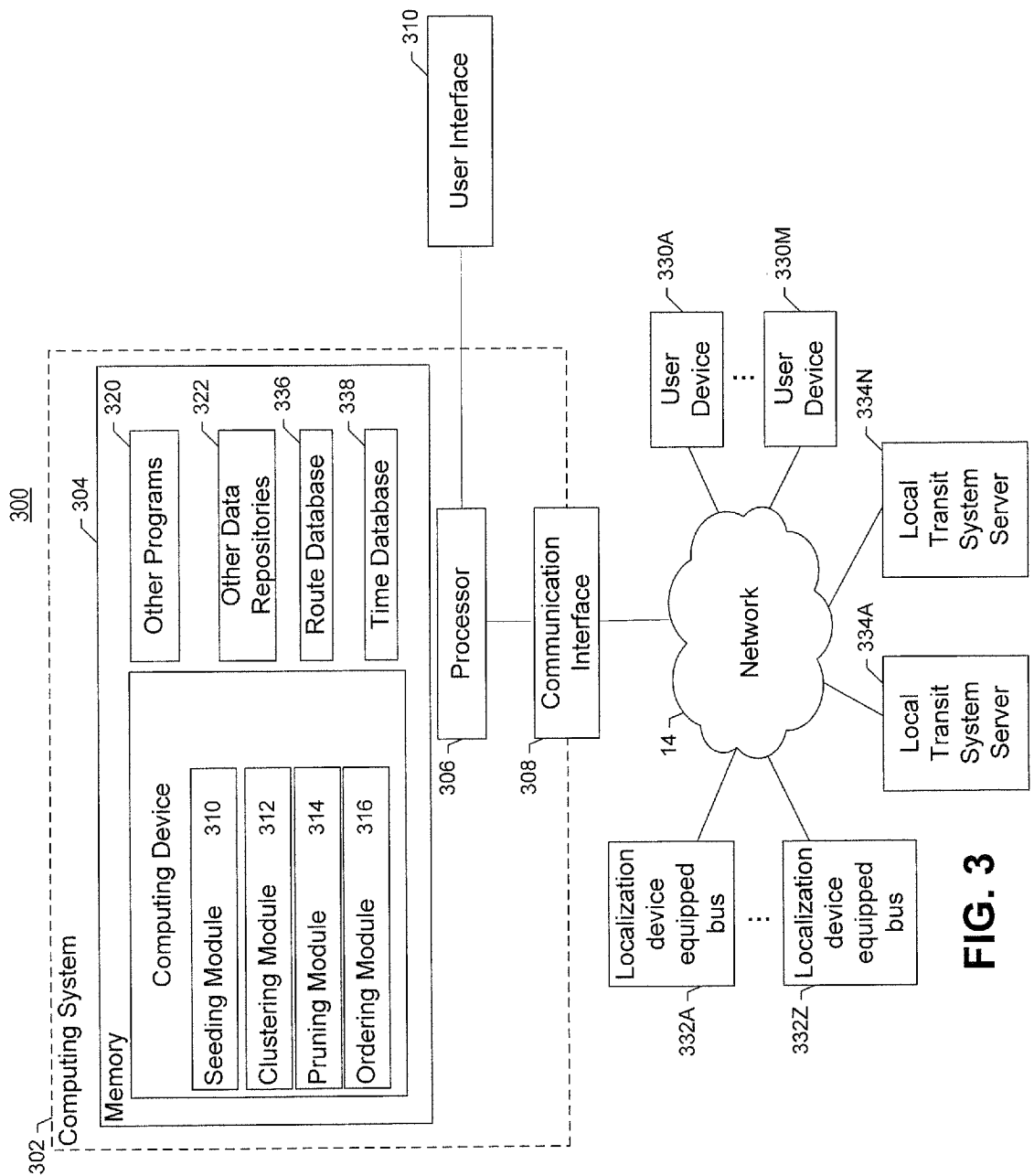

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is a block diagram of an apparatus that may be specifically configured in accordance with an example embodiment of the present invention.

Figure 4:
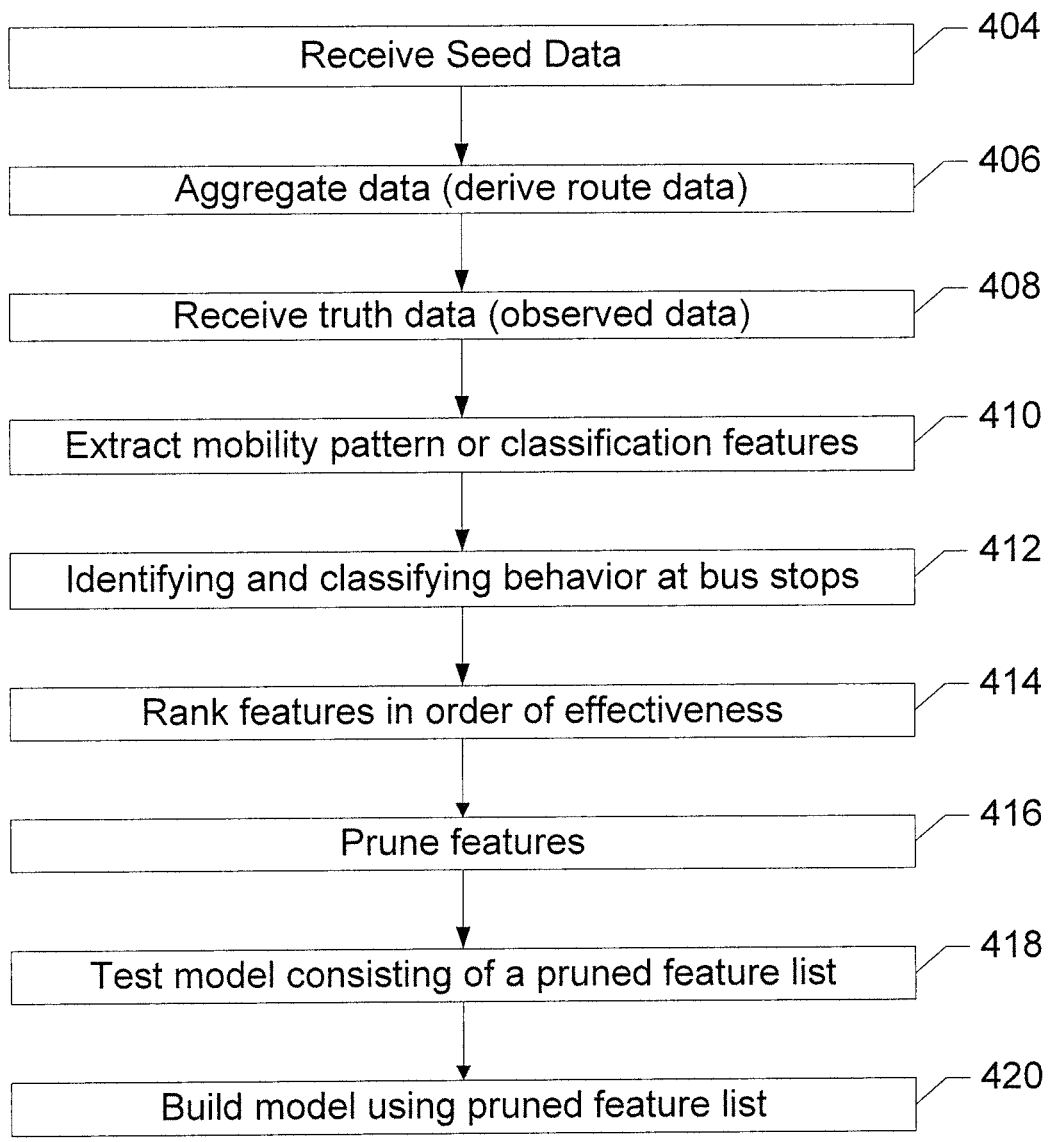
Figure 5:
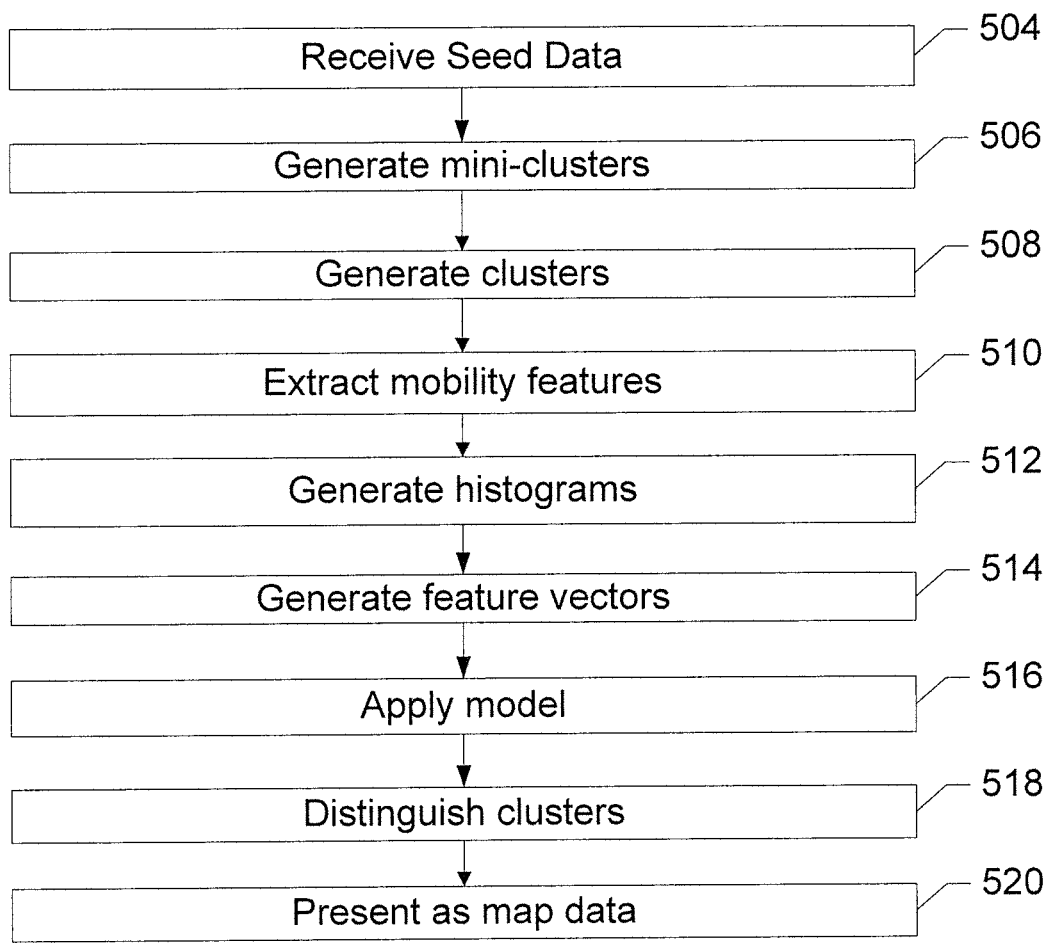
Figure 6:
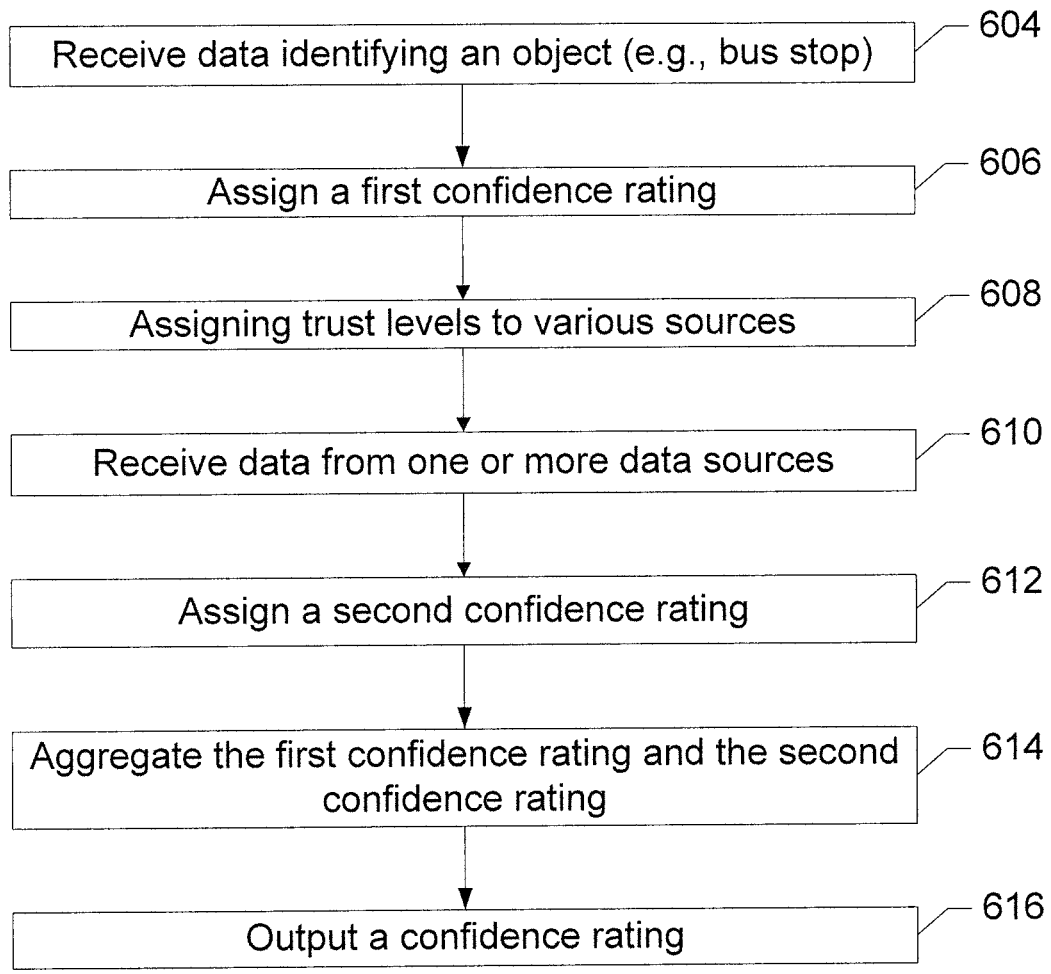

FIG. 4 is an example flowchart illustrating a method of operating an example apparatus in accordance with an embodiment of the present invention;

FIG. 5 is an example flowchart illustrating a method of operating an example apparatus in accordance with an embodiment of the present invention; and FIG. 6 is an example flowchart illustrating a method of operating an example apparatus in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device. The user device 14 may be embodied by a computing device, and in one embodiment, may be comprised of a plurality of computing devices.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

FIG. 3 is an example block diagram of an example computing system 300 for practicing embodiments of an automated transit route derivation system 302. In particular, FIG. 3 shows a system 300 that may be utilized to implement an automated transit route derivation system 302. Note that one or more general purpose or special purpose computing systems/devices may be used to implement the automated transit route derivation system 302. In addition, the system 302 may comprise one or more distinct computing systems/devices and may span distributed locations. Furthermore, each block shown may represent one or more such blocks as appropriate to a specific embodiment or may be combined with other blocks. For example, in some embodiments the system 302 may contain a seeding module 312, a clustering module 314, a pruning module 316, an ordering module 318 or a combination thereof. In other example embodiments, the seeding module 312, the clustering module 314, the pruning module 316, and/or the ordering module 318 may be configured to operate on separate systems (e.g. a mobile terminal and a remote server, multiple remote servers and/or the like). For example, the seeding module 312, the clustering module 314, the pruning module 316, and/or the ordering module 318 may be configured to operate on a mobile terminal. Also, automated transit route derivation system 302 may be implemented in software, hardware, firmware, or in some combination to achieve the capabilities described herein.

While the system 302 may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, system 302 comprises a computer memory ("memory") 304, one or more processors 306 (e.g. processing circuitry) and a communications interface 308. The computing device(s) are shown residing in memory 304. In other embodiments, some portion of the contents, some or all of the components of the automated transit route derivation device 302 may be stored on and/or transmitted over other computer-readable media. The components of the automated transit route derivation device 302 preferably execute on one or more processors 306 and are configured to receive transit data and derive a transit route, schedule, and/or stops. Other code or programs 320 (e.g., an administrative interface, a Web server, and the like) and potentially other data repositories, such as data repository 322, also reside in the memory 304, and preferably execute on processor 306. Of note, one or more of the components in FIG. 3 may not be present in any specific implementation.

In a typical embodiment, as described above, the automated transit route derivation system 302 may include a seeding module 312, a clustering module 314, a pruning module 316, an ordering module 318 or a combination thereof. The seeding module 312, the clustering module 314, the pruning module 316, the ordering module 318 or a combination thereof may perform functions such as those outlined in FIG. 1. The automated transit route derivation system 302 interacts via the network 14 via a communications interface 308 with (1) mobile terminals 330, (2) localization device equipped bus(es) 332 and/or (3) local transit system servers 334. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 308 may be capable of operating with one or more air interface standards, communication protocols, modulation types, access types, and/or the like. More particularly, the system 302, the communications interface 308 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the automated transit route derivation system 302 may be implemented using standard programming techniques. For example, the automated transit route derivation system 302 may be implemented as a "native" executable running on the processor 306, along with one or more static or dynamic libraries. In other embodiments, the automated transit route derivation system 302 may be implemented as instructions processed by a virtual machine that executes as one of the other programs 320. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the automated transit route derivation system 302, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the automated transit route derivation system 302 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on a user's mobile communications device 10. An HTML5 or JavaScript™ "app" allows web page script to contact a server 12, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

FIGS. 4, 5, and 6 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 4, 5, and 6, when executed, convert a computer or processing circuitry into a particular machine configured to perform an example embodiment of the present invention. Accordingly, the operations of FIGS. 4, 5, and 6 define an algorithm for configuring a computer or processing to perform an example embodiment. In some cases, a general purpose computer may be provided with an instance of the processor which performs the algorithms of FIGS. 4, 5, and 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 4 is an example flowchart illustrating a method of operating an example computing system performed in accordance with an embodiment of the present invention. Specifically FIG. 4 shows a machine learning component of the present invention. As shown in block 404 of FIG. 4, the apparatus 20 embodied by the computing device 10 may then therefore be configured to receive seed data. The apparatus embodied by the computing device therefore includes means, such as the processor 22, the communication interface 26 or the like, for causing reception of the seed data.

A specific example in the context of an embodiment of the present invention may be causing the reception of location data comprised of one or more GPS traces obtained from GPS devices. In one embodiment, GPS traces may be received as seed data. In another embodiment, the raw GPS traces may be organized by route and and/or direction and then may be received as seed data. Furthermore, two data collection strategies may be used (1) Participatory sensing (PS)—Humans submit GPS or other sensor reports via check-in and/or (2) a kind of opportunistic sensing (OS) whereby the GPS device is on a bus and submits GPS reports periodically. Here, a GPS trace $t_1$ is formed.

As shown in block 406 of FIG. 4, the apparatus 20 embodied by the computing device 10 may therefore be configured to aggregate data. The apparatus embodied by the computing device therefore includes means, such as the processor 22, the communication interface 26 or the like, for aggregating data. In the context of the present invention, the present invention may utilize the seed data (e.g., GPS reports) and form route data.

In one embodiment of the present invention, location data is received. The location data may be organized into a set, or route, where each location point in the set is a specific location along the route traveled by a specific bus. The present invention may be configured to receive a plurality of sets of data from a plurality of different buses or people on the buses. For each bus or person, the location data received is organized into a set, or route, and the set comprises each of the specific location points along the route that are reported.

As shown in block 408 of FIG. 4, the apparatus 20 embodied by the computing device 10 may therefore be configured to receive truth data. The apparatus embodied by the computing device therefore includes means, such as the processor 22, the communication interface 26 or the like, for receiving truth data. In the context of the present invention, truth data is actual observed data related to the locations of specific objects along a route, such as bus stops, stop signs, traffic signals or the like. Additionally or alternatively, additional route points (e.g., non-bus stops) may be annotated, collected, and/or received. In another embodiment, additional route points include locations that are not near (e.g., further than 20 m away from) bus stops, stop sign and/or traffic signals.

As shown in block 410 of FIG. 4, the apparatus 20 embodied by the computing device 10 may therefore be configured to extract mobility pattern data and/or classification features from the seed data. The apparatus embodied by the computing device therefore includes means, such as the processor 22, the communication interface 26 or the like, for extracting mobility data and/or classification features form the seed data. In the context of the present invention, mobility data may be data related to movement or locations near bus stops, stop signs and/or traffic signals. Additionally or alternatively, mobility data may related to movement or locations not near (e.g., further than 20 m) bus stops, stop signs, and/or traffic signals. Classification features may identifiable patterns in the mobility data. In one embodiment, the apparatus may be configured to extract mobility pattern data and/or classification features at a predetermined distance around a specific object or location from the truth data in order to identify the mobility pattern data and/or classification feature data associated with that specific object or location. For example, the truth data shows a true location of a bus stop, and the apparatus may be configured to extract mobility pattern data and/or classification data from a 20 m region around the bus stop.

In one embodiment, a machine learning classification strategy for capturing mobility patterns of location reporting objects in mini-clusters is utilized. The mobility patterns may then be represented as a normalized histogram where the bin values of the histogram are classification features. For example, the histogram may comprise a plurality of bins, each bin of the histogram may represent a fraction of a maximum cluster size.

In another embodiment, speed and/or heading data may be extracted ad utilized. For example, GPS traces may be utilized to calculate a speed and/or heading change. Additionally or alternatively, data from other sensors, for example, an accelerometer or gyrometer, may be utilized. In the context of the above example, speed and/or heading changes may be calculated within the 20 m region of a bus stop, stop sign, traffic lights and/or non-bus stop point. Furthermore additional features related to inter-cluster and intra-cluster distances of mini-clusters may also be utilized to improve bus stop detection accuracy.

As shown in block 412 of FIG. 4, the apparatus 20 embodied by the computing device 10 may therefore be configured to classify and/or identify specific objects, such as bus stops, stop signs, traffic signals and/or non-bus stop points. The apparatus embodied by the computing device therefore includes means, such as the processor 22, the communication interface 26 or the like, for classifying and/or identifying specific objects, such as bus stops, stop signs, traffic signals, and/or non-bus stop points. In the context of the present invention, any one of a plurality multiple machine learning models may be utilized to identify and/or recognize the mobility patterns and/or features of buses at bus stops, stop signs, traffic lights and/or non-bus stops and therefore, classify, identify and/or distinguish between a bus stop, a stop sign, a traffic light, and/or a non-bus stop. Trained machine learning models may include Bayes Net, Decision Trees, and Random Forest. To test the accuracy of the model, a tenfold cross validation strategy may be utilized. The WEKA machine learning package may be utilized for the machine learning process.

For exemplary purposes only, in one embodiment, a semi-supervised learning algorithm may be used to classify and identify the behavior of buses at bus stops, stop signs, traffic lights, and/or non-bus stop points. The learning algorithm requires a training data set to create a training Model. To build the training data, data from a plurality of buses (e.g., 1,000 buses) is collected and/or received (e.g., step 404). The buses may report their GPS location at predetermined time intervals (e.g., every 25-30 seconds). Additionally, true locations of bus stops along one or more routes are collected and/or received, for example from Chicago's CTA website (e.g., step 408). Additionally or alternatively, true location points (i.e. latitude and longitude points) of stop sign and/or traffic lights are collected and/or received. Additionally or alternatively, non-bus stop locations, non-stop sign locations and/or non-traffic light locations along the one or more routes may be collected and/or received. In another embodiment, given, each of these types of points, a predetermined distance (e.g., 20 m) bounding box may be formed around each point and mobility patterns and/or features of the mini-clusters within may be observed and/or extracted (e.g., step 410). Given these mini-clusters that are within the bounding box, a classification feature vector may be generated. Training data may then be labeled (i.e. identified) as for example, a bus stop, a stop sign, a traffic light, and/or a non-bus stop (e.g., step 412).

In another embodiment of the present invention, the true locations (i.e. latitude and longitude points) of stop signs and/or traffic lights may be utilized, wherein both locations of stop signs and/or traffic lights near bus stops and stop signs and/or traffic lights not near bus stops are collected and/or received. These traffic light and/or stop sign points may be labeled as non-bus stops and may be used to make a model realistic and robust. The importance of understanding and recognizing the patterns of traffic lights and stop signs may be utilized in bus stop detection since these points may look deceivingly similar to bus stops since buses may also stop at traffic lights and stop signs.

In one embodiment of the present invention, the size, whether predetermined or selected, of the bounding box utilized around the real world location (i.e. latitude and longitude points) of a specific object for extraction of mobility pattern data purposes, limits the accuracy of the model to that size. For example, when 20 m regions are formed around bus stops, traffic lights, stop signs, and/or non-bus stop locations, a detection algorithm will detect bus stops at most 20 m from the true location.

As shown in block 414 of FIG. 4, the apparatus 20 embodied by the computing device 10 may therefore be configured to rank features in order of effectiveness. The apparatus embodied by the computing device therefore includes means, such as the processor 22, the communication interface 26 or the like, for ranking features in order of effectiveness. In the context of the present invention, features may be ranked in order of their effectiveness to identify bus stops. For example, a count of location points where a bus is traveling at a low speed or is stopped may be more effective at identifying a bus stop in a given region than an average speed through a region.

As shown in block 416 of FIG. 4, the apparatus 20 embodied by the computing device 10 may therefore be configured to prune features. The apparatus embodied by the computing device therefore includes means, such as the processor 22, the communication interface 26 or the like, for pruning features. For example, if step 414 ranks the top 14 features in order of effectiveness in identifying bus stops, step 416 may prune the least effective.

As shown in block 418 of FIG. 4, the apparatus 20 embodied by the computing device 10 may therefore be configured to test a model utilizing a pruned feature list. The apparatus embodied by the computing device therefore includes means, such as the processor 22, the communication interface 26 or the like, for testing a model utilizing a pruned feature list.

As shown in block 420 of FIG. 4, the apparatus 20 embodied by the computing device 10 may therefore be configured to build a model for classifying and/or identifying specific objects, such as bus stops, stops signs, and/or traffic signals based on received seed data. The apparatus embodied by the computing device therefore includes means, such as the processor 22, the communication interface 26 or the like, for building a model to classify and/or identify specific objects, such as bus stops, stops signs, and/or traffic signals based on received seed data. The model may also be configured to identify and/or distinguish locations not near bus stops, stops signs, and/or traffic signals from locations near or locations identifying bus stops, stop signs, and/or traffic signals.

FIG. 5 is an example flowchart illustrating a method of operating an example computing system performed in accordance with an embodiment of the present invention. Specifically, FIG. 5 may show an example embodiment related to utilizing a trained learning machine to identify and/or distinguish whether a cluster is a bus stop, stop sign, and/or traffic light. As shown in block 504 of FIG. 5, the apparatus 20 embodied by the computing device 10 may therefore be configured to receive seed data. The apparatus embodied by the computing device therefore includes means, such as the processor 22, the communication interface 26 or the like, for causing reception of the seed data.

A specific example in the context of an embodiment of the present invention may be causing the reception of one or more GPS traces obtained from GPS devices. In one embodiment, GPS traces may be received as seed data. In another embodiment, the raw GPS traces may be organized by route and and/or direction and then may be received as seed data. Furthermore, two data collection strategies may be used (1) Participatory sensing (PS)—Humans submit GPS or other sensor reports via check-in and/or (2) a kind of opportunistic sensing (OS) whereby the GPS device is on a bus and submits GPS reports periodically. Here, a GPS trace $t_1$ is formed.

As shown in block 506 of FIG. 5, the apparatus 20 embodied by the computing device 10 may therefore be configured to cluster the seed data. The apparatus embodied by the computing device therefore includes means, such as the processor 22, the communication interface 26 or the like, for clustering the seed data. In one embodiment, block 506 comprises spatial cluster formation, wherein the clusters include a point from one GPS trace and one or more points from one or more different traces within a predetermined distance. Thus, for all GPS points $p_1, p_2, p_3 \ldots p_z$ on $t_1$, the present invention may form a cluster with the GPS points on the traces in $t_{set}$ (set of traces for that route and pattern) that have GPS points within a predetermined distance (e.g., 3 m). Thus, z clusters may be formed. Each cluster may comprise a center, computed such that the cluster center shifts as we add new GPS points to the cluster. In one embodiment, at each GPS point on $t_1$, added is the closest point on any other trace $t_1 \in t_{set}$ unless a predetermined threshold is exceeded.

As an example of the present invention, there may be a requirement for GPS points to be clustered within a distance of 3 m. The intuition behind clustering according to a specific distance is that for specific objects, buses have a predictable behavior. For example, at bus stops, buses always stop close to the bus stop for passengers to board or alight the bus. Consequently, at a bus stop the number of GPS reports should be high. For other points on the route, since the buses are not stopping the number of GPS reports should not be as high as at a bus stop. Furthermore, regions around traffic lights and stop signs may also observe high frequency of reports. However, these objects (traffic lights and stop signs) may have different distribution patterns which can be used to identify and/or distinguish between these objects and bus stops. For example, at stop signs buses may not stop completely, or for a long time. Based on GPS data, it may be observed that buses mostly slow down or stop briefly. As another example, in the case of traffic lights, buses may stop at arbitrary points when adhering to any given stop light. For a given stop light, a bus may stop at 400 m (e.g., in traffic), 40 m, 50 m, or 5 m from the stop light. However, for bus stops, drivers may tend to stop the buses as close as possible to the bus stop.

In an embodiment of the present invention, given the mini-clusters formed above, the apparatus may be configured to identify spatial and/or temporal patterns to identify specific objects, such as bus stops, stop signs, and/or traffic lights.

Once the mini-clusters are formed, the apparatus 20 embodied by the computing device 10 may therefore be configured to generate clusters, as shown in block 508 of FIG. 4. The apparatus embodied by the computing device may therefore include means, such as the processor 22, the communication interface 26 or the like, for generating clusters. Given the mini-clusters formed above, clusters or cluster sets may be generated to capture mini-cluster density and distribution within the cluster sets.

As shown in block 510 of FIG. 4, the apparatus 20 embodied by the computing device 10 may therefore be configured to extract mobility features. The apparatus embodied by the computing device therefore includes means, such as the processor 22, the communication interface 26 or the like, for extracting mobility features. The mobility patterns are captured using a plurality of classification features that can capture the distribution of GPS points in a set of clusters along with other mobility features. Some of classifications that may be extracted may be the bins of histogram, discussed below, that represent distribution of the mini-clusters. Other classification features may be related mobility patterns on speed, and the densities of the bins of the histogram.

As shown in block 512 of FIG. 4, the apparatus 20 embodied by the computing device 10 may therefore be configured to generate histograms. The apparatus embodied by the computing device therefore includes means, such as the processor 22, the communication interface 26 or the like, for generating histograms.

Histograms of the cluster sizes may be generated to capture the distribution of a desired spatial object. The histogram may contain 10 bins. Each bin of the histogram may represent a fraction of the maximum cluster size $c_{max}$. The maximum cluster size may be obtained by comparing the number of reports in each mini-cluster. In one embodiment of the present invention, each bin except the last bin contains 5% increment in terms of fraction of $c_{max}$. Thus, the first bin may contain the number of clusters with number of reports <=5% of $c_{max}$, the second bin may contain the number of clusters with number of reports <=10% of $c_{max}$, the third bin may contain the number of clusters with number of reports <=15% $c_{max}$ (i.e. 5% increments) the last bin may then contain the number of clusters with number of reports >45% of $c_{max}$. Based on observation, $c_{max}$ may occur at the start and/or end of the routes since the buses normally sit at these points.

In one embodiment of the present invention, each bin frequency may be represented as a fraction of the total number of points represented in that histogram. Subsequently, the ratios between bins are maintained, but the scale of their magnitudes is normalized. Thus, this avoids bias when comparing samples with different densities. Observe that the sum of all bin frequencies for each histogram=1.0. Based on the histogram example above, a pattern may be observed. For regular points that are not bus stops nor stop light or stop signs, the frequency may be higher for the first bins. This means the number of reports is much less than $c_{max}$. This make sense, since the buses are not sitting at these points, the number of reports from these location is small.

An example vector after normalization for a point that is not a bus stop, stop sign, or traffic signal may look like: 1.0, 0.0, 0.0, 0.0, 0.0, 0.0, 0.0, 0.0, 0.0, 0.0. Thus, the most active bins are the lowest bins in the set of all bins of the histogram.

For traffic lights and stop signs, the pattern from the histogram may also be obtained. Buses stop at these points briefly, not longer than at bus stops but longer than regular non important route points. Thus, the histogram's first few bins may contain the most weight. An example vector after normalization for a stop sign or traffic light may look like 0.6666666666666666, 0.3333333333333333, 0.0, 0.0, 0.0, 0.0, 0.0, 0.0, 0.0, 0.0.

In the case of a bus stop, the number of GPS reports at these points may be high since buses are stopping for passengers to board the bus. Thus, the first set of bins is normally empty or has less information. An example vector after normalization for a bus stop may look like 0.0, 0.0, 0.5, 0.0, 0.375, 0.0, 0.125, 0.0, 0.0, 0.0. Thus the upper level bins of the histogram are the most active.

As shown in block 514 of FIG. 4, the apparatus 20 embodied by the computing device 10 may therefore be configured to generate feature vectors. The apparatus embodied by the computing device therefore includes means, such as the processor 22, the communication interface 26 or the like, for generating features vectors. In one in embodiment, a feature vector may contain the bins of the histogram shown in step 510. Additionally or alternatively, a feature vector may include one or more other classification features. In yet another embodiment of the present invention, a feature vector may include one or more of (1) a number of stationary GPS reports for each cluster; (2) a computed average speed across clusters; and/or (3) a sum of one or more bins (e.g., bin1 and bin2).

With regard to the number of stationary GPS reports for each cluster, stationary may include speeds less than or equal to a threshold velocity (e.g., 2 m/s). The speed may be computed from consecutive latitudes and longitudes of a given bus. The calculated speed may be estimated due to buses submitting GPS reports every at some frequency e.g. 25-30 seconds. Even though the computed speed may be inaccurate, computation of speeds from raw GPS gives an indication if a bus was sitting at a location for a period of time. Then for a set of mini-clusters, the classification feature low_speed_weight=number of low speed reports in the cluster set/total reports across the cluster set.

Regarding a computed speed across clusters, each point has a computed speed, which may allow for the computation of the average speed for a cluster. In one embodiment, for a set of clusters, the classification speed may be the average speed across clusters.

Regarding a sum of two or more bins, given points on the route that are not bus stops nor stop lights or stop signs, this classification feature which sums the first two bins should be close to 1. In one embodiment, where the classification feature is the sum of the first two bins, this is a representation of the density of the first two bins.

Additionally or alternatively, other attributes may be utilized (i.e. speed and heading of the buses) to increase accuracy of bus stop, traffic light, and/or stop sign detection. The reasoning being that since buses pull over (i.e. heading change) to the bus stop and then go to zero speed, a classification vector showing such changes would increase bus stop detection. In another embodiment of the present invention, buses may be equipped with other sensors (e.g., an accelerometer and/or gyrometer). As such, the present invention may receive data from the other sensors and utilized the received data to improve the detection accuracy. Additionally or alternatively, if additional classification features that capture inter and intra cluster distances of mini-clusters within a cluster set are obtained and/or calculated, accuracy may also be improved. The improvement may be generated based on inter and intra cluster distances being lower due to, at bus stops, the clusters should be denser than those of stop lights.

As shown in block 516 of FIG. 4, the apparatus 20 embodied by the computing device 10 may therefore be configured to apply a detection model. The apparatus embodied by the computing device therefore includes means, such as the processor 22, the communication interface 26 or the like, for applying a detection model. The detection model may be developed from a machine learning classification system utilized real world, observed and/or annotated data of locations of bus stops, traffic signal, and/or stop signs.

As shown in block 518 of FIG. 4, the apparatus 20 embodied by the computing device 10 may therefore be configured to distinguish clusters. The apparatus embodied by the computing device therefore includes means, such as the processor 22, the communication interface 26 or the like, for distinguishing clusters.

As shown in block 520 of FIG. 4, the apparatus 20 embodied by the computing device 10 may therefore be configured to present map data. The apparatus embodied by the computing device therefore includes means, such as the processor 22, the communication interface 26 or the like, for presenting map data.

FIG. 6 is an example flowchart illustrating a method of operating an example computing system performed in accordance with an embodiment of the present invention. Specifically, FIG. 6 may show an example embodiment related to assigning, calculating or determining a confidence rating to a specified object, such as a bus stop, stop sign, and/or traffic light. In one embodiment, given a set of route based aggregated moving object sensor traces, FIG. 6 shows a method for bus stop confidence labeling.

In one embodiment, automated object (e.g., bus stop) detection is enabled via, for example, spatial distribution pattern mining that may identify spatial properties of the moving objects at specified objects such as transit stops, terminals or the like. These patterns may represent a distribution of localization traces using a dynamic strategy where the volume of historical localization data collected may not affect the performance. The dynamism may be enabled by making the distributions based on moving objects report densities. Given these patterns, a bus stop location may be identified via a classification strategy that captures and recalls these patterns and then determines the confidence rating probabilistically. Since the patterns are stored, for automated transit stop confidence rating labeling, we can then pass arbitrary spatial points to it for both detection inference and confidence labeling. The inference may have a Boolean output (e.g., yes/no) but may also vary if other objects are needed to be determined. The confidence labeling is represented as a probability, but other representations may also be used. The transit stop confidence rating may give an intuition on the most recent utilization of the transit stop. This classification system may account for a variety patterns.

As such, as shown in block 604 of FIG. 6, the apparatus 20 embodied by the computing device 10 may therefore be configured to receive data. The apparatus embodied by the computing device therefore includes means, such as the processor 22, the communication interface 26 or the like, for causing reception of data. The data may comprise at least one location of a specified object (e.g., a bus stop, traffic light, stop sign). The data may also comprise a transit route comprising locations of at least one of bus stops, traffic lights, and stop signs.

As shown in block 606 of FIG. 6, the apparatus 20 embodied by the computing device 10 may therefore be configured to assign, calculate or determine a first confidence rating to one or more specified objects. The apparatus embodied by the computing device therefore includes means, such as the processor 22, the communication interface 26 or the like, for assigning, calculating or determining a first confidence rating to one or more specified objects. The first confidence rating may be based on a first source (for example, a location device on the bus or bus driver), wherein the confidence rating may represent a probabilistic determination of a location's utilization of a specified object, such as a bus stop. For example, given a location identified as a bus stop, each time a bus travels the route, a confidence rating of the location may be affected. If the bus displays characteristics of utilizing the location as a bus stop, the confidence rating associated the specified object may increase. However, if the bus does not display characteristics of utilizing the location as a bus stop, the confidence rating may decrease. The increase and/or decrease in the confidence rating based on whether the bus stops at a particular location identified as a bus stop, may be a function of how many data points have factored into the identification of the location as a bus stop. For example, if a route is traveled 100 times per day, and one bus appears to not utilize a location as a bus stop, the impact may be small. The increase and/or decrease may also utilize the frequency at which buses appear to utilize and/or not utilize a location as a bus stop.

As shown in block 608 of FIG. 6, the apparatus 20 embodied by the computing device 10 may therefore be configured to assign a trust level, comprising a confidence rating factor to each of one or more data sources. The apparatus embodied by the computing device therefore includes means, such as the processor 22, the communication interface 26 or the like, for assigning a trust level, comprising a confidence rating factor to each of one or more data sources.

In one embodiment, a passenger may be a data source. A passenger may ride often, such as everyday on their commute to work, or a passenger may ride less often. In one embodiment, a commuter may be assigned a higher trust level than a non-commuter. For example, a trust level may be assigned based on the level of usage of the transit system and/or route. In one embodiment, a confidence rating factor is associated with each trust level. For example, data from a data source with a first trust level may have a higher confidence rating factor than data from a data source with a second trust level. For example, data regarding a location's utilization of a bus stop acquired from a commuter who may take the bus every day may be given more weight in adjusting the confidence rating associated with a location than data acquired from a tourist.

As shown in block 610 of FIG. 6, the apparatus 20 embodied by the computing device 10 may therefore be configured to receive data from one or more data sources. The apparatus embodied by the computing device therefore includes means, such as the processor 22, the communication interface 26 or the like, for receiving data from one or more data sources. In one embodiment, data may be received via photos, texts, phone calls, specific applications, such as an "app" that may submit particular location information, time information, and/or a input on whether the location is being utilized as a bus stop of not.

As shown in block 612 of FIG. 6, the apparatus 20 embodied by the computing device 10 may therefore be configured to assign, calculate or determine a second confidence rating to one or more specified objects. The apparatus embodied by the computing device therefore includes means, such as the processor 22, the communication interface 26 or the like, for assigning, calculating or determining a second confidence rating to one or more specified objects.

In one embodiment, a second confidence rating is calculated based on the data received from the one or more data sources. The second confidence rating of a location is a function of the number of received indications of whether a location is being utilized as a bus stop. Each data source, having an associated trust level, may affect the second confidence rating according to the particular confidence rating factor associated with the trust level. For example, in an instance in which five commuters each indicating that a location is being utilized as a bus stop, and one non-commuter indicates that the location is not being used a bus stop, the second confidence rating may be for example, a 0.9 or 90%, due to each commuter having a confidence rating factor which is for example twice that of the non-commuter.

As shown in block 614 of FIG. 6, the apparatus 20 embodied by the computing device 10 may therefore be configured to aggregate the first confidence rating and the second confidence rating. The apparatus embodied by the computing device therefore includes means, such as the processor 22, the communication interface 26 or the like, for aggregating the first confidence rating and the second confidence rating.

In one embodiment, the aggregation of the two confidence ratings to produce the final rating may be an average, a weighted average or the like. In another embodiment, the aggregation may be a more sophisticated weighted based analysis where the weights are based on the variance of the two observation errors.

In one embodiment, only a single confidence rating is calculated where each source (e.g., bus, commuter, non-commuter) is assigned a confidence rating factor.

As shown in block 616 of FIG. 6, the apparatus 20 embodied by the computing device 10 may therefore be configured to output a confidence rating. The apparatus embodied by the computing device therefore includes means, such as the processor 22, the communication interface 26 or the like, for outputting a confidence rating.

In one embodiment, the confidence rating may be output on a map or on a schedule near or associated with the specified object (e.g., bus stop). In one embodiment, block arrows may be utilized to represent, in general, the direction of travel of a transit system moving object, such as a bus. More specifically, a filled block arrow may represent a historical route that has not been changed and an unfilled block arrow may represent a change to the route. Changes may be common in many transit systems. For example, in a bus or rail transit system re-route arises because of incidents such as construction or accident. Likewise, in an aircraft transit system, re-routes may occur because of weather or changes to its (i.e. aircraft transit system) business model, among other factors. A grid based block arrow may represent the old route where the route deviation (i.e. re-route) has just occurred. Circles represent the bus stops along the routes.

In one embodiment, beside each bus stop may an arrow or line that indicates an initial expected transit confidence rating change. Thus, for the case of the new route segment, an initial confidence rating of the new bus stops may increase using the automated algorithm described above. Likewise, for an old route where the spatial deviation occurs, a confidence rating of the bus stops decreases. Furthermore, other data sources, such as the public, may submit reports actively or passively including data indicating whether a bust stop on an old route is "out of service" and specific bus stops on a new route is "in service". These reports from the public may then be converted to a confidence measure and appended to the confidence rating. In one embodiment, a confidence rating of the bus stops on an unchanged section of a route may have a line instead of an arrow to indicate that the bus stop confidence rating is stable at a given time. When the re-route expires and the old route becomes active, a confidence rating for the affected bus stop shifts the reverse direction automatically. Thus, a new confidence rating strategy for transit stops may be dynamic and automated. Inactive and/or out-of-service bus stops may become active when the bus passes a stop on the original route.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    causing reception of location data, wherein the location data is organized into a plurality of sets, each set comprised of a plurality of location points;
    generating a plurality of mini-clusters, each mini-cluster comprised of a first location point from a first set and one or more subsequent location points, wherein each subsequent location point is located within a predetermined distance of the first location point, wherein the first location point representing a center of the mini-cluster shifts as one or more additional location points are added to the mini-cluster;
    generating a histogram for each of a plurality of clusters, each cluster of a predetermined distance and comprising one or more mini-clusters within the distance, wherein each bin of the histogram represents a fraction of a maximum cluster size;
    generating a feature vector for each cluster, the feature vector comprising normalized values representing each of the bins of the histogram; and
    distinguishing whether one or more clusters represent a specified object based on the feature vector.

2. The method of claim 1 wherein the determining step further comprises:
    determining a location of the specified object by identifying one or more spatial or temporal patterns of the mini-clusters matching particular classification features of the specified object.

3. The method of claim 1 further comprising:
    receiving training data from location reporting devices;
    capturing classification features of training data;
    training a detection model to detect a bus stop based on the captured classification features; and
    wherein the distinguishing step applies the detection model to the feature vector to distinguish whether the feature vector represents the specified object.

4. The method of claim 1 further comprising calculating a speed between consecutive location points from a same set, and wherein the one or more classification features comprises a value representing a number of location points where the calculated speed is less than a predetermined threshold.

5. The method of claim 1 further comprising calculating an average speed across a cluster, wherein the one or more classification features comprises a value representing the average speed across the cluster.

6. The method of claim 1 further comprising calculating a confidence rating for each location indicative of whether the location is being utilized as the specified object at a given time.

7. The method of claim 1 further comprising presenting a map comprising one or more bus stops along a route.

8. An apparatus comprising at least one processor and at least one memory including computer program code, the at least one memory and the computer program code configured to, with the processor, cause the apparatus to at least:
    receive location data, wherein the location data is organized into a plurality of sets, each set comprised of a plurality of location points;

generate a plurality of mini-clusters, each mini-cluster comprised of a first location point from a first set and one or more subsequent location points, wherein each subsequent location point is located within a predetermined distance of the first location point, wherein the first location point representing a center of the mini-cluster shifts as one or more additional location points are added to the mini-cluster;

generate a histogram for each of a plurality of clusters, each cluster of a predetermined distance and comprising one or more mini-clusters within the distance, wherein each bin of the histogram represents a fraction of a maximum cluster size;

generate a feature vector for each cluster, the feature vector comprising normalized values representing each of the bins of the histogram; and distinguish whether one or more clusters represent a specified object based on the feature vector.

9. An apparatus according to claim 8, wherein the at least one memory and the computer program code are further configured to, with the processor, cause the apparatus to:

determine a location of the specified object by identifying one or more spatial or temporal patterns of the mini-clusters matching particular classification features of the specified object.

10. An apparatus according to claim 8, wherein the at least one memory and the computer program code are further configured to, with the processor, cause the apparatus to:

receive training data from location reporting devices;
capture classification features of training data;
train a detection model to detect a bus stop based on the captured classification features; and wherein the distinguishing step applies the detection model to the feature vector to distinguish whether the feature vector represents the specified object.

11. An apparatus according to claim 8, wherein the at least one memory and the computer program code are further configured to, with the processor, cause the apparatus to calculate a speed between consecutive location points from a same set, and wherein the one or more classification features comprises a value representing a number of location points where the calculated speed is less than a predetermined threshold.

12. An apparatus according to claim 8, wherein the at least one memory and the computer program code are further configured to, with the processor, cause the apparatus to calculate an average speed across a cluster, wherein the one or more classification features comprises a value representing the average speed across the cluster.

13. An apparatus according to claim 8, wherein the at least one memory and the computer program code are further configured to, with the processor, cause the apparatus to calculate a confidence rating for each location indicative of whether the location is being utilized as the specified object at a given time.

14. An apparatus according to claim 8, wherein the at least one memory and the computer program code are further configured to, with the processor, cause the apparatus to present a map comprising one or more bus stops along a route.

15. A computer program product comprising at least one non-transitory computer-readable storage medium having computer-executable program code portions stored therein, the computer-executable program code portions comprising program code instructions for:

causing reception of location data, wherein the location data is organized into a plurality of sets, each set comprised of a plurality of location points;

generating a plurality of mini-clusters, each mini-cluster comprised of a first location point from a first set and one or more subsequent location points, wherein each subsequent location point is located within a predetermined distance of the first location point, wherein the first location point representing a center of the mini-cluster shifts as one or more additional location points are added to the mini-cluster;

generating a histogram for each of a plurality of clusters, each cluster of a predetermined distance and comprising one or more mini-clusters within the distance, wherein each bin of the histogram represents a fraction of a maximum cluster size;

generating a feature vector for each cluster, the feature vector comprising normalized values representing each of the bins of the histogram; and distinguishing whether one or more clusters represent a specified object based on the feature vector.

16. A computer program product according to claim 15, wherein the computer-executable program code portions further comprise program code instructions for:

determining a location of the specified object by identifying one or more spatial or
temporal patterns of the mini-clusters matching particular classification features of the specified object.

17. A computer program product according to claim 15, wherein the computer-executable program code portions further comprise program code instructions for:

receiving training data from location reporting devices;
capturing classification features of training data;
training a detection model to detect a bus stop based on the captured classification features; and
wherein the distinguishing step applies the detection model to the feature vector to distinguish whether the feature vector represents the specified object.

18. A computer program product according to claim 15, wherein the computer-executable program code portions further comprise program code instructions for calculating a speed between consecutive location points from a same set, and wherein the one or more classification features comprises a value representing a number of location points where the calculated speed is less than a predetermined threshold.

19. A computer program product according to claim 15, wherein the computer-executable program code portions further comprise program code instructions for calculating an average speed across a cluster, wherein the one or more classification features comprises a value representing the average speed across the cluster.

20. A computer program product according to claim 15, wherein the computer-executable program code portions further comprise program code instructions for calculating a confidence rating for each location indicative of whether the location is being utilized as the specified object at a given time.

21. A computer program product according to claim 15, wherein the computer executable program code portions further comprise program code instructions for presenting a map comprising one or more bus stops along a route.

* * * * *

UNITED STATES PATENT AND TRADEMARK OFFICE
CERTIFICATE OF CORRECTION

PATENT NO. : 9,489,637 B2  
APPLICATION NO. : 13/872439  
DATED : November 8, 2016  
INVENTOR(S) : Modica et al.

Page 1 of 1

It is certified that error appears in the above-identified patent and that said Letters Patent is hereby corrected as shown below:

In the Claims

Column 24
Line 60, "computer executable" should read --computer-executable--

Signed and Sealed this
Second Day of January, 2018

Joseph Matal
*Performing the Functions and Duties of the*
*Under Secretary of Commerce for Intellectual Property and*
*Director of the United States Patent and Trademark Office*